Patented Mar. 14, 1944

2,344,195

UNITED STATES PATENT OFFICE 2,344,195

BRAZING FLUX

Harry L. Anthony and James C. Turnbull, Pittsburgh, Pa., assignors to Scaife Company, Oakmont, Pa., a corporation of Pennsylvania No Drawing. Application March 3, 1943, Serial No. 477,850

8 Claims. (Cl. 148—26)

This invention relates to brazing fluxes.

An object of the invention is to provide brazing fluxes which are of simple composition and are made from readily available materials, which possess good persistency at temperatures of 1200° to 1500° F. and higher, do not liberate objectionable amounts of noxious fumes during use, possess good fluidity and excellent wetting power for ferrous and non-ferrous metals, which melt to a clear liquid, and leave a clear residue which is soluble in water.

A further object is to provide a method of preparing brazing fluxes of the foregoing type, and particularly fluxes composed of neutral potassium fluoride, borax and boric acid.

A special object is to provide a method of compounding neutral potassium fluoride, borax and boric acid to provide a paste-like brazing flux in a stablized form in which it does not tend to harden, or set up, over long periods of time.

Other objects will appear from the following description.

The fluxes provided by this invention are made from neutral potassium fluoride (KF), borax ($Na_2B_4O_7.10H_2O$) and boric acid ($H_3BO_3$). We have discovered, and it is upon this that our invention is in part predicated, that brazing fluxes superior to all others known to us, particularly for use with non-ferrous metals, may be produced by following a particular procedure in preparing the flux from those materials. In accordance with the invention the powdered fluoride, borax and boric acid are mixed with water to form a paste. When the water is added, a thermal effect occurs, and after it has subsided the mixture is heated to effect solution of the solid ingredients. After the solution has been formed in that manner, the material is cooled and allowed to stand, whereupon it forms a paste which is then ready for use.

The exact reason for the thermal effect which occurs when the water is added is not known. It may be due to a true chemical reaction, or it may be due to some other cause. It is known that when water is added to a mixture of potassium fluoride and boric acid, heat is liberated, and it has been postulated that this is caused by an exothermic chemical reaction with production of a complex reaction product. In contrast, the addition of water to the mixture of potassium fluoride, borax and boric acid in the present invention results in a strongly endothermic effect, this difference being due, evidently, to the presence of borax, which presumably exerts some effect not encountered with potassium fluoride and boric acid alone. Consequently, the present practice produces an entirely distinct product. We now believe, however, for that and other reasons, that a true chemical reaction occurs and that the final product is a reaction product, but we do not limit ourselves by that belief.

As exemplifying the practice of the invention, a flux adapted for use in the brazing of such diverse materials as brass, stainless steel, copper, Monel metal, and the like, with brazing solders melting in the low range, e. g., about 900° to 1800° F., is made from about 35 per cent of neutral potassium fluoride, 10 per cent of borax, 45 per cent of boric acid, and the remainder water, the foregoing proportions being by weight. The solid ingredients are powdered and mixed, and the water is then stirred into the mixture. As the water is added, the mixture cools, due to the endothermic effect, and it becomes mushy. After the endothermic reaction or effect has terminated, the mass is heated, while stirring, to about 185° F., whereupon the solid constituents go into solution. The solution is then cooled, suitably while stirring, and there is thus produced a smooth paste-like flux.

The proportions may, of course, be varied, but there are certain limitations which are important. First we have found that to produce satisfactory results it is necessary to heat the material after the endothermic effect has terminated. Also, the amount of water must be such as to form a paste, but on the other hand, if too much water is used the product will be too thin and there will be a tendency for solid matter to settle out. Generally speaking, it is believed that there should be used at least about 4 per cent of water, and that it should not exceed about 20 per cent. As evidencing how the proportions may be varied, a flux having substantially the properties of that made in accordance with the foregoing example is produced by using from 20 to 40 per cent of potassium fluoride together with borax and boric acid in amounts such as to maintain the ratio of 10 parts by weight of the former to 45 parts by weight of the latter, the remainder being, of course, water. Other alkali metal fluorides, or mixtures of such fluorides, might be substituted for the potassium fluoride, or other alkali metal tetraborates for borax, the proportions being varied accordingly.

Referring again to the heating step, the mixture need be heated only to a temperature at which the solid constituents dissolve. We prefer to heat to about 185° F., but this is not critical. If the material is heated to about 210° F. some gas or vapor is evolved, indicating a change, but this does not deleteriously affect the properties of the flux.

Whatever the cause of the endothermic effect, and whatever its result, the fact is that the fluxes produced in accordance with our invention are superior to all other brazing fluxes with which we have had experience. For instance, a flux prepared in accordance with the foregoing example possesses a desirably low melting point, approximately 750° to 800° F. It melts to a clear liquid, which is particularly desirable because the operator can thus view the joint and judge the progress of the brazing operation and its quality. The flux is soluble in water, and it dissolves readily from a finished joint by immersing it in warm water, e. g., at about 140° F. Although the flux contains fluoride, and such fluxes are often considered objectionable because they liberate large amounts of corrosive or poisonous fluoride fume, experience has shown that our fluxes liberate little fume in use, particularly as compared with fluxes containing acid fluorides, the amount being unobjectionable. They likewise exhibit excellent persistency, this characteristic being such that the fluxes are useful not only with silver solder, but with any brazing solder which melts in the range from, for example, about 900° to 1800° F. The surface tension of these fluxes is low so that they exhibit good fluidity. Particularly, we have found that the wetting power of fluxes prepared in accordance with our invention is the best with non-ferrous metals of any flux with which we have had experience. Another important characteristic of fluxes made in accordance with the invention is that they are decidedly alkaline. For example, the pH of the flux of the foregoing example is about 9.6 to 9.8. This is an important and desirable property because fluoride fluxes can cause serious corrosion if they are acid.

Flux pastes made as described tend to set up, or harden, on standing. We have discovered furthermore that the fluxes may be stabilized against setting by modifying the foregoing procedure. In accordance with this aspect of our invention, the powdered ingredients are mixed with just enough water to form a paste, usually about 4 parts by weight of water, and after the endothermic effect the mixture is heated and cooled as described. The product is then permitted to stand, or age, until it begins to set up, which normally occurs in about three or four days. After it has set up to an extent such as to form a stiff paste, the balance of the water is stirred into it, producing a paste which apparently will not set up when stored for indefinitely long periods of time. It is important, however, in working up the partially set material to add just enough water to bring it back to the paste-like consistency, otherwise the stabilizing effect may not be attained.

According to the provisions of the patent statutes, we have explained the principle and method of practicing our invention and have described what we now consider to represent its best embodiment. However, we desire to have it understood that, within the scope of the appended claims, the invention may be practiced otherwise than as specifically described.

We claim:

1. A brazing flux comprising reaction product of a neutral alkali metal fluoride, alkali metal tetraborate, boric acid and water in amounts such that an endothermic effect occurs upon mixing them, and the composition being in the form of a paste product resulting from heating after the occurrence of said effect.

2. A brazing flux comprising about 20 to 40 per cent by weight of neutral potassium fluoride, 4 to 20 per cent by weight of water, and the remainder borax and boric acid in the proportion of 10 parts by weight of the former to 45 parts by weight of the latter and being a product resulting from mixing said fluoride, water, borax and boric acid and heating after the resultant endothermic effect has occurred.

3. A brazing flux comprising about 35 per cent of neutral potassium fluoride, 10 per cent of borax, 45 per cent of boric acid, and the remainder water, the flux being in the form of a paste produced by mixing the fluoride, borax, boric acid and water and heating subsequent to the occurrence of the resultant endothermic effect.

4. That method of making a brazing flux which comprises adding water to form a paste of a mixture of a neutral alkali metal fluoride, alkali metal tetraborate, and boric acid proportions such that an endothermic effect occurs thereupon, permitting said endothermic effect to occur in the mixture, then heating the mixture to produce a solution, and cooling the solution and thereby forming a pasty mass.

5. That method of making a brazing flux which comprises adding water to form a paste of a mixture of a neutral alkali metal fluoride, borax and boric acid in proportions such that an endothermic effect occurs thereupon, permitting said endothermic effect to occur in the mixture, then heating the mixture to produce a solution, and cooling the solution and thereby forming a pasty mass.

6. That method of making a brazing flux from about 20 to 40 per cent by weight of neutral potassium fluoride, about 10 per cent by weight of water, and the remainder borax and boric acid in the proportion of 10 parts by weight of the former to 45 parts by weight of the latter which comprises mixing a portion of said water with said potassium fluoride, borax and boric acid, permitting an endothermic effect to occur in the mixture, then heating the mixture to effect solution, cooling the heated material to form a pasty mass, aging said mass until it has partially set, and then mixing the partially set mass with the remainder of the water to bring it to a pasty condition.

7. That method of making a brazing flux which comprises adding about 4 parts by weight of water to 35 parts by weight of neutral potassium fluoride, about 10 parts by weight of borax, and about 45 parts by weight of boric acid, permitting an endothermic effect to occur in the mixture, then heating the mixture to about 185° F., cooling the heated material, aging the cooled material until it has partially set, and then mixing the partially set mass with about 6 parts by weight of water to bring it to a pasty condition.

8. That method of making a brazing flux which comprises adding from about 4 to 20 per cent by weight of water to form a paste of about 20 to 40 per cent by weight of neutral potassium fluoride, and the remainder borax and boric acid in the proportion of about 10 parts by weight of the former to 45 parts by weight of the latter, with development of an endothermic effect in the mixture, then heating the mixture to about 185° F., and then cooling and thereby forming a pasty mass.

HARRY L. ANTHONY.
JAMES C. TURNBULL.